United States Patent
Gopal et al.

(10) Patent No.: US 7,607,068 B2
(45) Date of Patent: Oct. 20, 2009

(54) APPARATUS AND METHOD FOR GENERATING A GALOIS-FIELD SYNDROME

(75) Inventors: Vinodh Gopal, Westboro, MA (US); Gilbert M. Wolrich, Framingham, MA (US); Daniel Cutter, Maynard, MA (US); Wajdi Feghali, Boston, MA (US); Robert P. Ottavi, Brookline, NH (US)

(73) Assignee: Intel Corporation, Santa Clara, CA (US)

( * ) Notice: Subject to any disclaimer, the term of this patent is extended or adjusted under 35 U.S.C. 154(b) by 582 days.

(21) Appl. No.: 11/469,222

(22) Filed: Aug. 31, 2006

(65) Prior Publication Data

US 2008/0059865 A1 Mar. 6, 2008

(51) Int. Cl.
*G11C 29/00* (2006.01)
(52) U.S. Cl. .................. 714/770; 714/781; 714/785; 714/801; 711/114
(58) Field of Classification Search .............. 714/781, 714/770, 785, 801
See application file for complete search history.

(56) References Cited

U.S. PATENT DOCUMENTS

| | | | | |
|---|---|---|---|---|
| 4,555,784 | A * | 11/1985 | Wood | ............ 714/785 |
| 5,105,378 | A | 4/1992 | Mori | |
| 6,952,476 | B1 | 10/2005 | Mao | |
| 2003/0142818 | A1 | 7/2003 | Raghunathan et al. | |
| 2005/0108613 | A1 | 5/2005 | Kobayashi | |
| 2005/0283714 | A1 | 12/2005 | Korkishko et al. | |
| 2006/0156211 | A1 | 7/2006 | Edirisooriya | |
| 2008/0162806 | A1 * | 7/2008 | Gopal et al. | ............ 711/114 |

FOREIGN PATENT DOCUMENTS

JP 2000259359 A 9/2000
WO 2008027734 A1 3/2008

(Continued)

OTHER PUBLICATIONS

"PCI Express Base Specification Revision 1.0", PCI Express (Jul. 22, 2002), 428 pgs.

(Continued)

*Primary Examiner*—Guy J Lamarre
(74) *Attorney, Agent, or Firm*—Grossman, Tucker, Perreault & Pfleger, PLLC (57) ABSTRACT

The present disclosure provides an apparatus and method for generating a Galois-field syndrome. One exemplary method may include loading a first data byte from a first storage device to a first register and loading a second data byte from a second storage device to a second register; ANDing the most significant bit (MSB) of the first data byte and a Galois-field polynomial to generate a first intermediate output; XORing each bit of the first intermediate output with the least significant bits (LSBs) of the first data byte to generate a second intermediate output; MUXing the second intermediate output with each bit of the first data byte to generate a third intermediate output; XORing each bit of the third intermediate output with each bit of the second data byte to generate at a fourth intermediate output; and generating a RAID Q syndrome based on, at least in part, the fourth intermediate output. Of course, many alternatives, variations and modifications are possible without departing from this embodiment.

24 Claims, 4 Drawing Sheets

FOREIGN PATENT DOCUMENTS

WO         2008027735 A1     3/2008

OTHER PUBLICATIONS

"PCI-X Addendum to the PCI Local Bus Specification", PCI Special Interest Group: Revision 1.0a, (Jul. 24, 2000), 240 pgs.

"American National Standard for Information Technology- Fibre Channel- Physical and Signalling Interface-3 (FC-PH-3)", Developed by incits, Where IT all Begins (1998), 116 pgs.

"Working Draft American National Standard, Project T10/1601-D", Information Technology-Serial Attached SCSI- 1.1 (SAS-1.1): Revision 1 (Sep. 18, 2003), 464 pgs.

"Intel XScale Core", Developer's Manual (Dec. 2000), 220 pgs.

"Announcing the Advanced Encryption Standard (AES)", Federal Information Processing Standards Publication 197 (Nov. 26, 2001) 51 pgs.

"Data Encryption Standard (DES)", FIPS PUB 46-3 (Oct. 25, 1999) 26 pgs.

"International Search Report and Written Opinion", PCT/US2007/076147 (Dec. 11, 2007)10 Pages.

"Serial ATA: High Speed Serialized AT Attachment, Serial ATA Workgroup", APT Technologies, Inc.: Revision 1.0 (Aug. 29, 2001) 9 pgs.

Huang, L. et al., "An Efficient Multiple-Precision Division Algorithm", Proceedings of the sixth International Conference on Parallel and Distributed Computing, Application and Technologies (PDCAT'05) IEEE.

"International Search Report and Written Openion", PCT/US2007/076149, (Jan. 8, 2008),10 pgs.

Feghali, Wajdi, et al., "Cryptographic System Component", U.S. Appl. No. 11/323,329, filed Dec. 30, 2005.

Feghali, Wajdi, et al., "Cryptography Processing Units and Multiplier", U.S. Appl. No. 11/323,993, filed Dec. 30, 2005.

Feghali, Wajdi, et al., "Multiplier", U.S. Appl. No. 11/323,994, filed Dec. 30, 2005.

Feghali, Wajdi, et al., "Programmable Processing Unit", U.S. Appl. No. 11/354,404, filed Feb. 14, 2006.

* cited by examiner

APPARATUS AND METHOD FOR GENERATING A GALOIS-FIELD SYNDROME

FIELD

The present disclosure describes an apparatus and method for generating a Galois-field syndrome.

BACKGROUND

A RAID-6 system may be configured to stripe and interleave data, parity (P) and a Galois-field syndrome (hereinafter "Q syndrome" or "Q") across a plurality of storage devices (e.g., disk drives). The Q syndrome may be used to recover data sectors if two storage devices fail. To generate the Q syndrome, some RAID-6 systems utilize Galois-field calculations using a Galois-field polynomial in combination with data blocks. A Galois-field is a field with a finite number of elements. Galois-field calculations with 8-bit (Byte) fields, as applied to RAID systems, may allow for a maximum of 257 drives, 255 ($2^8-1$) of which may be data drives. The other two drives may be XOR parity (P) and the Reed-Solomon code Q. For example, given a series of stripes 0-3 (where each stripe includes 3 data disks and 2 syndrome disks), an operation may be performed on a stripe where each byte in a block (e.g., 512 bytes) may be independent from the others. The following equations define P and Q for a RAID-6 array with n data disks and 2 check disks (P may be plain parity across the stripe).

$$P = D_0 \oplus D_1 \oplus D_2 \ldots \oplus D_{n-1} \quad \text{EQ. 1)}$$

$$Q = g^0 * D_0 \oplus g^1 * D_1 \oplus g^2 * D_2 \ldots \oplus g^{n-1} * D_{n-1}; \quad \text{EQ. 2)}$$

where D represents a data byte from a respective storage device of a RAID system and generator (g) may be defined as an element of the field that can generate all elements of the field including successive powers: $g^i$.

The inverse of a generator for Galois-field ($2^8$) can be computed using the following equation:

$$g^{-a} = g^{255-a} \quad \text{EQ. 3)}$$

Some of the more popular techniques for Galois-field algebra are implemented in software and utilize look-up tables to perform computations. For example, the equations listed above may be represented as look-up tables for specific polynomials (e.g. Galois-field multiplication tables for polynomials such as 11D, etc.). Alternatively, existing hardware implementations may utilize a large number of Galois-field multipliers, which may require a significant hardware investment and silicon area to perform these calculations. Further, conventional hardware approaches may be limited in that it may require the use of one particular Galois-field polynomial.

BRIEF DESCRIPTION OF DRAWINGS

Features and advantages of the claimed subject matter will be apparent from the following detailed description of embodiments consistent therewith, which description should be considered with reference to the accompanying drawings, wherein:

Although the following Detailed Description will proceed with reference being made to illustrative embodiments, many alternatives, modifications, and variations thereof will be apparent to those skilled in the art.

DETAILED DESCRIPTION

Figure 1:
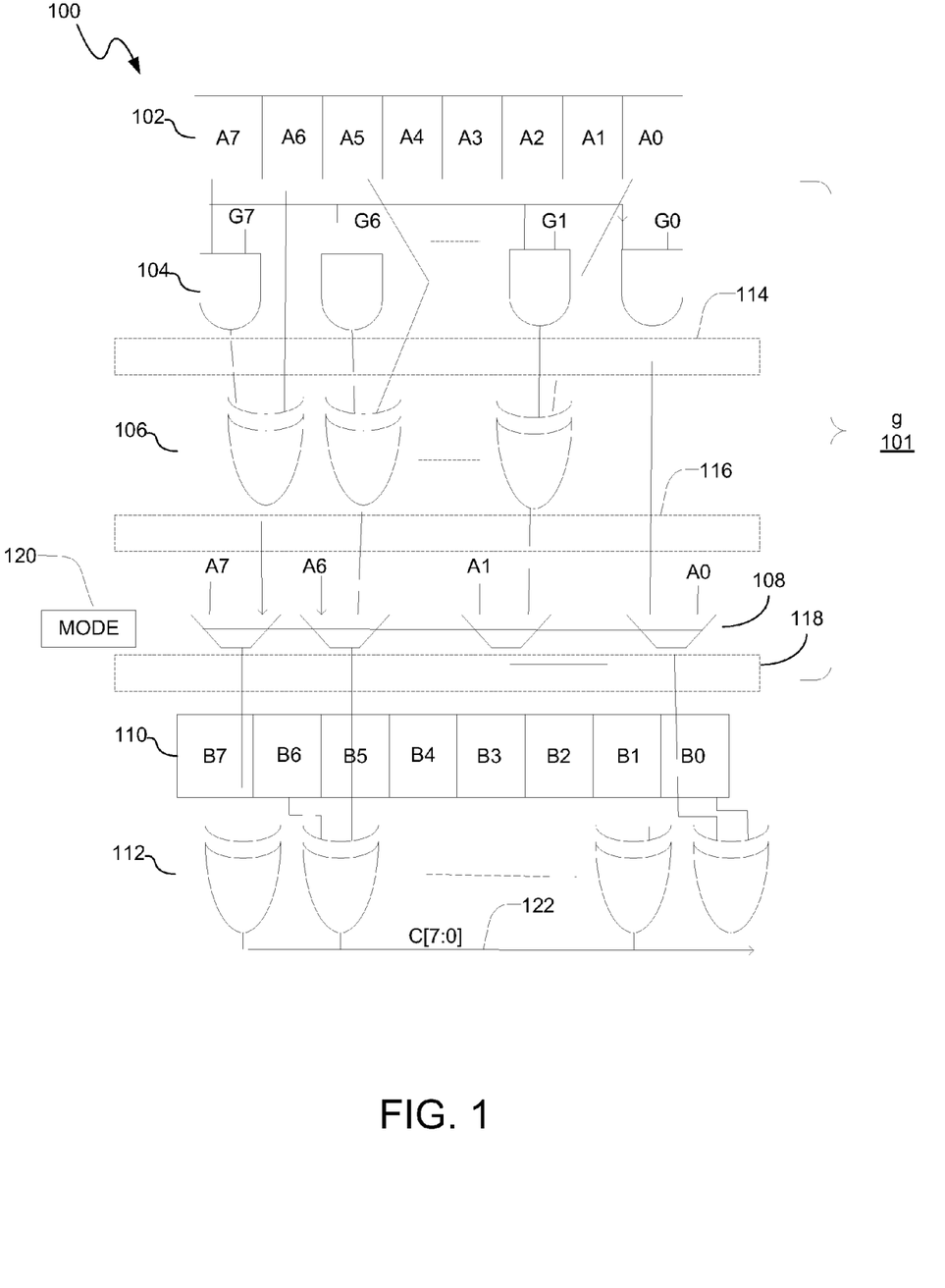
FIG. 1 is a diagram showing one exemplary embodiment of the present disclosure.

Generally, this disclosure describes circuitry and methodology for generating a Q syndrome, in addition to other RAID-related calculations. FIG. 1 depicts a circuit 100 in accordance with one exemplary embodiment of the present disclosure. Circuit 100 may be configured to perform Galois-field operations to generate a Q syndrome on any Galois-field polynomial, including, for example, standardized Galois-field polynomials such as the 11D and 14D polynomials. In general, a Q syndrome may be generated using data bytes across one or more stripes of a plurality of storage devices in a RAID system and a Galois-field polynomial.

Circuit 100 may include a first register 102, AND circuitry 104, first XOR circuitry 106, MUX (multiplexer) circuitry 108, a second register 110 and second XOR circuitry 112. AND circuitry 104, first XOR circuitry 106 and MUX circuitry 108 may collectively form generator circuitry 101 and configured to perform generator (g) operations in a Galois-field computation. The first register 102 may comprise an 8-bit register (e.g., bits A7, ..., A0) and may be configured to store a first byte of data from a first data disk of a RAID system (not shown in this Figure). AND circuitry 104 may include a plurality of AND gates. In this embodiment, AND circuitry 104 may include 8 AND gates, one for each bit of the first register 102. AND circuitry 104 may be configured to AND the most significant bit (MSB) of the first data byte stored in register 102 with each bit of an 8-bit Galois-field polynomial (represented bit-wise in this Figure as G7, G6, ..., G1, G0) to generate a first intermediate output 114. In this example, the Galois-field polynomial may be stored in a register and may include a specific primitive polynomial such as the 11D and/or other primitive Galois-field polynomial.

First XOR circuitry 106 may include a plurality of XOR gates. In this example, first XOR circuitry 106 may include seven (7) XOR gates, and each XOR gate may be configured to XOR the remaining bits, respectively, of the first data bytes (e.g., the least significant bits) with the first intermediate output 114 to generate a second intermediate output 116. The second intermediate output 116 may be a byte long and include the least significant bit of the first intermediate output 114.

MUX circuitry 108 may include a plurality of MUX circuits. In this example, MUX circuitry 108 may include 8 MUX circuits, and each MUX circuit may be configured to MUX the second intermediate output 116 with each respective bit of the second data byte (stored in register 102). The second register 110 may comprise an 8-bit register (e.g., bits B7, ..., B0) and may be configured to store a second data byte from a second data disk of a RAID system (not shown in this Figure). Second XOR circuitry 112 may include a plurality of XOR gates. In this example, second XOR circuitry may include eight (8) XOR gates, and each XOR gate may be configured to XOR respective bits of the third intermediate output 118 with respective bits of the second data byte (stored in register 110) to generate a fourth intermediate output. The output 122 of the second MUX circuitry 112 may be used, at least in part, to generate a Q syndrome.

This embodiment may also include mode circuitry 120. Mode circuitry 120 may control the operation of MUX circuitry 108 for Galois-filed operations (to generate a Q syndrome) or for parity operations (to generate P). If mode circuitry 120 controls MUX circuitry 108 for Galois-field operations, then each MUX circuit may operate as described above. If mode circuitry 120 controls MUX circuitry to generate parity (P), then the output of MUX circuitry 108 may be contents of register 102, and the parity value (P) may be generated by XORing the contents of register 102 with the contents of register 110, using for example, the second XOR circuitry 112. In this instance, output 122 may be the parity data (P) calculated for a given RAID protocol.

Depending on the number of storage devices in a given RAID system, the circuit 100 of FIG. 1 may be configured for iterative operations. For example, for n-number of storage devices in a RAID system, the next iterative operations of the circuit 100 may be to replace the contents of register 102 with output 122 and replace the contents of register 110 with a data byte from the next storage device, and repeating the AND, XOR and MUX operations (described above) for each storage device in the RAID system. When the last storage device is reached, output 122 may be the Q syndrome which may be written to an appropriate sector on one of the storage devices, according to the RAID protocol being used.

The following is an example of the operations of the circuit 100 to generate a Q syndrome for a selected stripe on a RAID system with three data disks (D0, D1 and D2). EQ. 2, above, may be factorized to yield:

$$Q = D_0 \oplus g(D_1 \oplus g^* D_2). \quad \text{EQ. 4}$$

Here, D0, D1 and D2 may refer to three data disks and g corresponds to the generator.

A bit-wise form of EQ. 4 may be expressed as:

$$Q = D_0 \oplus g.(D_1 \oplus (g(D_2))); \quad \text{EQ. 5}$$

Initially, a byte of data from D2 may be loaded into register 102 and a byte of data from D1 may be loaded into register 110. Evaluating EQ. 5 from the innermost parentheses outward, the expression g(D2) may be calculated using AND circuitry 104, XOR circuitry 106 and MUX circuitry 108, and may be represented by the third intermediate output 118. The expression $(D_1 \oplus (g(D_2)))$ may be calculated by XORing third intermediate result 118 with the D1 data byte (stored in register 110), and may be represented by output 122. The expression $g.(D_1 \oplus (g(D_2)))$ may be calculated by loading output 122 into register 102 and repeating the operations of AND circuitry 104, XOR circuitry 106 and MUX circuitry 108 to generate another third intermediate result (118', not shown). A byte of data from D0 may be loaded into register 110, and the expression $D_0 \oplus g.(D_1 \oplus g(D_2))$ may be evaluated by XORing the third intermediate result 118' D0 to yield the Q syndrome.

Of course, this is an example of operations for a 3-disk RAID system, and these concepts may be extended to a RAID system with n-number of disks. Further, while the circuit 100 of Figure depicts operations in an 8-bit data path, in alternative embodiments the circuit of FIG. 1 may be configured for other bit-depths, for example, 16-bit, 32-bit, and/or 64-bit data paths. In such alternate embodiments, the Galois-field polynomial may correspondingly include a 16-bit, 32-bit and/or 64-bit primitive polynomial.

Exemplary pseudocode for both the Galois-field mode (to generate the Q syndrome) and bit-wise XOR mode (to generate parity P) are shown below. As described above, the mode selection circuitry 120 may be used to control selection of the mode of MUX circuitry 108. For example, if MUX circuitry 108 is set to Galois-field mode the 8 most significant bits (MSB) of global variable G7-G0 may be designated as a polynomial (e.g., a galois-field polynomial (GFP)).

In Galois-field mode, c[63:0]=a[63:0] CONFIG_XOR b[63:0] may be calculated as:

```
For (i=0; i<8; i++){
    c[7+8i:8i] = GF-XOR(a[7+8i:8i], b[7+8i:8i]);
}
// performs a*x + b mod GFP in galois-field (2^8)
char GF-XOR(char a, char b){ // each char is 1 byte
    char t;
    // check msb of a
    If (a(7)==1) {t = (a <<1) ⊕ GFP;}
    else { t = (a <<1);}
    // <<1 is logical shift left by 1, ⊕ is regular bit-wise xor function
    return (t ⊕ b);
}
```

The iterative operations set forth above may be performed in parallel using 1 cycle, thus each iteration may represent one byte-slice and there may be 8 such byte-slices implemented, for example, in hardware. These 8 byte slices (i.e. 64 bits) may be delivered to XOR circuitry 112, as described above.

Alternatively, in bit-wise mode, c[63:0]=a[63:0] CONFIG_XOR b[63:0] may be calculated using a similar approach to the bit-wise ⊕ operation used previously: c[i]=a[i]⊕b[i] for all i in [63:0].

Figure 2:
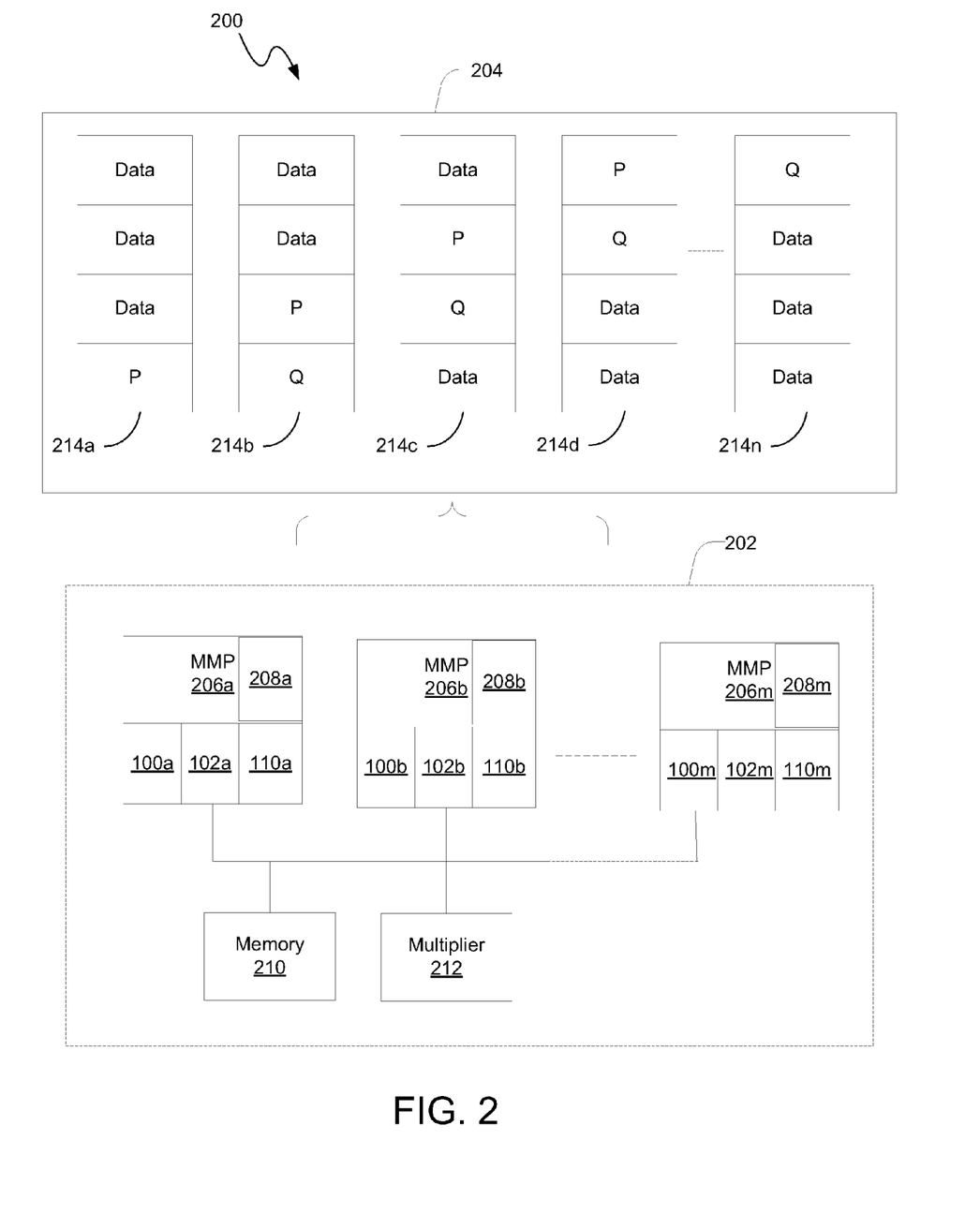
FIG. 2 is a block diagram showing another exemplary embodiment of the present disclosure.

The circuit 100 of FIG. 1 may be implemented, for example, in an integrated circuit (IC) which may include, for example, a System-on-a-Chip (SoC), an application specific integrated circuit (ASIC) and/or a field programmable gate array (FPGA). "Integrated circuit", as used in any embodiment herein, means a semiconductor device and/or microelectronic device, such as, for example, but not limited to, a semiconductor integrated circuit chip. Referring now to FIG. 2, one exemplary system embodiment 200 is depicted. In this embodiment, IC 202 may be configured to generate P and Q data on a RAID system 204. The IC 202 of this embodiment may include a plurality of modular math processors (MMP) 206a, 206b, . . . , 206m. MMP 206a may include circuit 100a, first register 102a and second register 110. In addition, MMP 206a may include a third register 208a configured to store a Galois-field polynomial, such as the 11D and/or 14D polynomial (represented as G7-G0 in FIG. 1). In at least one embodiment, register 208a is reloadable so that any Galois-field polynomial may be used. MMP 206b, . . . , 206m may be similarly configured. IC 202 may also include memory 210 and multiplier 212. Memory 210 may be configured to store RAID-related data, which may include, for example, data bytes from a plurality of RAID storage devices.

Multiplier 212 may be configured to perform multiplication operations during Q syndrome calculations. For example, to generate the Q syndrome, in some embodiments, a general computation of the form (c0*D0 ⊕ c1*D1 ⊕ c2*D2 ⊕ . . . cn*Dn) may be used. The "c" coefficients may each be an 8-bit polynomial. This multiplication may be performed using multiplier 212, while the remaining computations may be performed using circuitry 100a-100m, as described above. Further, the operations described herein may be performed in parallel using the appropriate bytes from each disk block. In some embodiments, IC 202 may be configured to operate in a 64-bit data path. For example, if m=8, 8 MMP circuits may operate in parallel concurrently in a 64-bit data path.

RAID system 204 may include a plurality of storage devices 214a, 214b, 214c, . . . , 214n. IC 202 may be configured to stripe and interleave data, parity data (P) and Galois-field syndrome data (Q) across the devices, in a manner shown in this figure and/or according to a RAID level/protocol implemented by the RAID system 204.

Figure 3:
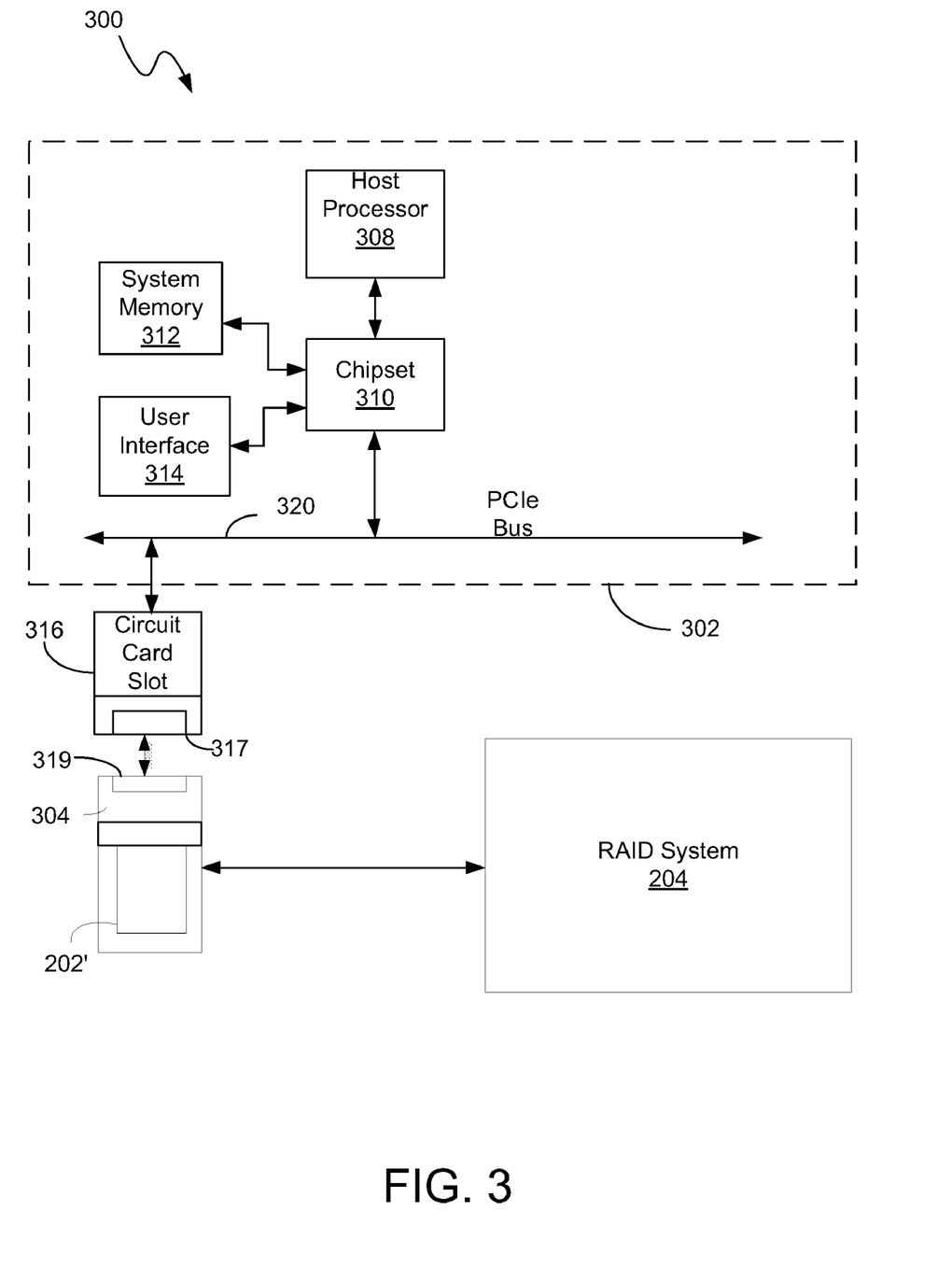
FIG. 3 is a block diagram of yet another exemplary embodiment of the present disclosure.

FIG. 3 illustrates another exemplary system embodiment 300. The system 300 may generally include a host system 302 a circuit card 304 and a RAID system 204. Host system 302 may include, for example, host processor 308, a bus 320, a user interface system 314, a chipset 310, system memory 312, a circuit card slot 316, and circuit card 304 configured to communicate with RAID system 204. The host processor 308 may include any variety of processors known in the art such as an Intel® Pentium® IV processor commercially available from the Assignee of the subject application. The bus 320 may include various bus types to transfer data and commands. For instance, the bus 320 may comply with the Peripheral Component Interconnect (PCI) Express™ Base Specification Revision 1.0, published Jul. 22, 2002, available from the PCI Special Interest Group, Portland, Oreg., U.S.A. (hereinafter referred to as a "PCI Express™ bus"). The bus 320 may also comply with the PCI-X Specification Rev. 1.0a, Jul. 24, 2000, available from the aforesaid PCI Special Interest Group, Portland, Oreg., U.S.A.

The user interface system 314 may include a variety of devices for human users to input commands and/or data and to monitor the system such as a keyboard, pointing device, and video display. The chipset 310 may include host bridge/hub system (not shown) that couples the processor 308, system memory 312, and user interface system 314 to each other and to the bus 320. Chipset 310 may include integrated circuit chips, such as those selected from integrated circuit chipsets commercially available from the assignee of the subject application (e.g., graphics memory and I/O controller hub chipsets), although other integrated circuit chips may also, or alternatively be used. The processor 308, system memory 312, chipset 310 and circuit card slot 316 may be integrated onto one circuit board.

The circuit card 304 may be constructed to permit it to be inserted into slot 316. When the circuit card 304 is properly inserted into slot 316, connectors 319 and 317 become electrically and mechanically coupled to each other. When connectors 319 and 317 are so coupled to each other, the card 304 becomes electrically coupled to bus 320 and may exchange data and/or commands with system memory 312, host processor 308, and/or user interface system 314 via bus 320 and chipset 310. Alternatively, without departing from this embodiment, the operative circuitry of the circuit card 304 may be included in other structures, systems, and/or devices. These other structures, systems, and/or devices may be, for example, in the host system 302, coupled to the bus 320.

Circuit card 304 may include IC 202' to control the operation of RAID system 204. This may include, for example, generating Q syndrome (Q) and parity data (P) for the storage devices contained within the RAID system 204 (as described above). In addition, IC 202' may be configured to communicate with RAID system 204 using a plurality of communication protocols.

For example, if a Fibre Channel communication protocol is used by IC 202' to exchange commands and/or data with RAID system 204, it may comply or be compatible with the interface/protocol described in ANSI Standard Fibre Channel Physical and Signaling Interface-3 X3.303:1998 Specification. Alternatively or additionally, if a serial ATA (S-ATA) protocol is used by IC 202' to exchange commands and/or data with RAID system 204, it may comply or be compatible with the protocol described in "Serial ATA: High Speed Serialized AT Attachment," Revision 1.0, published on Aug. 29, 2001 by the Serial ATA Working Group. Further alternatively or additionally, if a serial attached small computer system interface (SAS) protocol is used by IC 202' to exchange commands and/or data with RAID system 204, it may comply or be compatible with the protocol described in "Information Technology—Serial Attached SCSI—1.1 ," Working Draft American National Standard of International Committee For Information Technology Standards (INCITS) T10 Technical Committee, Project T10/1562-D, Revision 1, published Sep. 18, 2003, by American National Standards Institute (hereinafter termed the "SAS Standard") and/or later-published versions of the SAS Standard. Of course, other alternative communication protocols and/or after-developed communication protocols may be used by IC 202' without departing from this embodiment, and such alternative and/or after-developed communications protocols shall be deemed equivalent communications protocols.

To that end, RAID system 204 may include a plurality of storage devices that may comply or are compatible with SATA, SAS and/or FC communication protocols. For example, in one exemplary embodiment, RAID system 204 may include a plurality of SATA disk drives, and thus, IC 202' may be configured to exchange commands and data with RAID system 204 using a SATA communications protocol.

Figure 4:
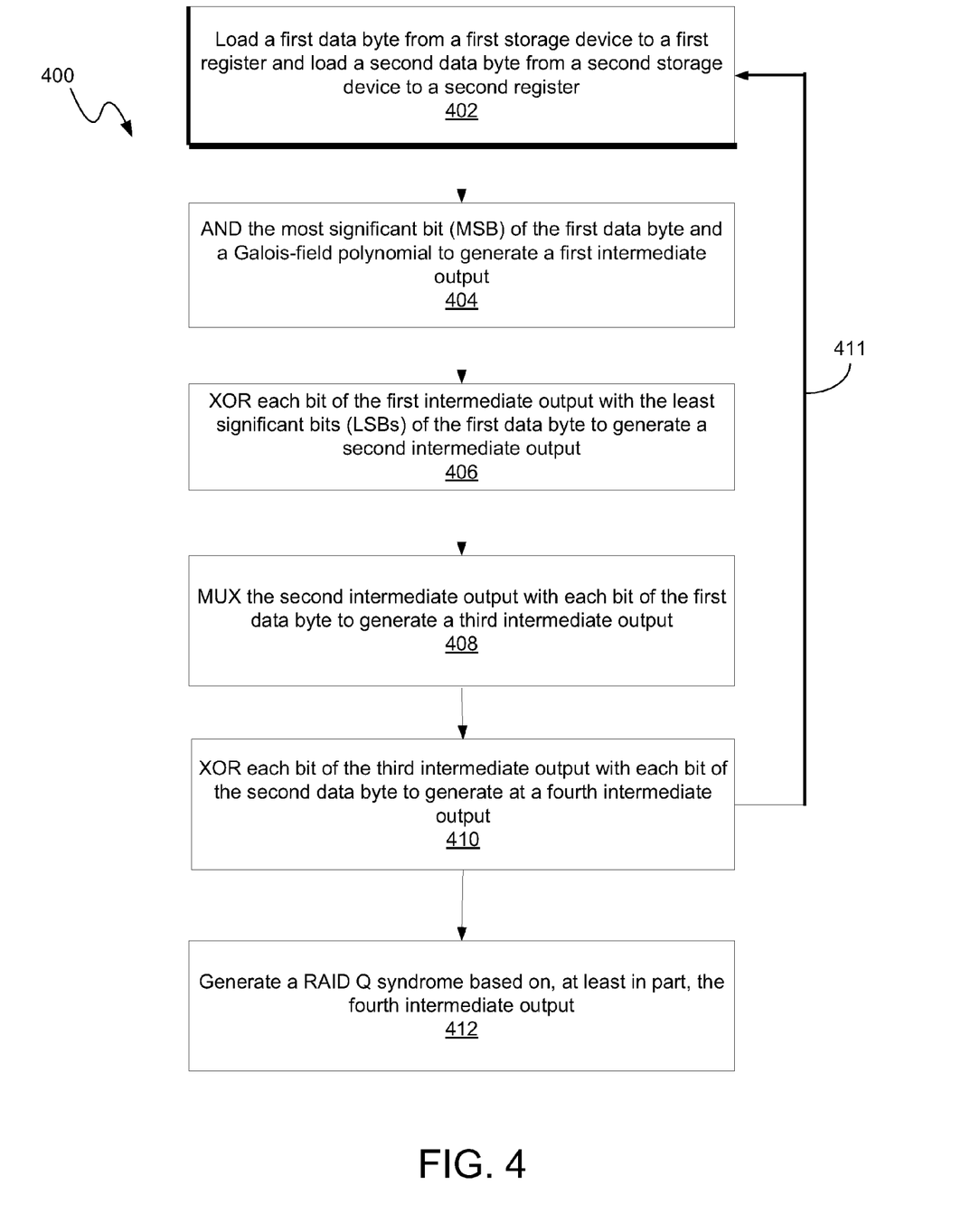
FIG. 4 is a flowchart of operations according to one embodiment of the present disclosure.

FIG. 4 illustrates a flowchart 400 of exemplary operations according to one embodiment. Operations may include loading a first data byte from a first storage device to a first register and load a second data byte from a second storage device to a second register 402. Operations may also include ANDing the most significant bit (MSB) of said first data byte and a Galois-field polynomial to generate a first intermediate output 404. Operations may additionally include XORing each bit of the first intermediate output with the least significant bits (LSBs) of the first data byte to generate a second intermediate output 406. Operations may also include MUXing the second intermediate output with each bit of the first data byte to generate a third intermediate output 408. Operations may further include XORing each bit of the third intermediate output with each bit of the second data byte to generate at a fourth intermediate output. Operations may additionally include to iteratively replacing the contents of the first register with the fourth intermediate output and replace the contents of the second register with a data byte from another storage device, and repeating for each storage device in a RAID system 411. Operations may also include generating a RAID Q syndrome based on, at least in part, the forth intermediate output 412.

As used in any embodiment described herein, "circuitry" may comprise, for example, singly or in any combination, hardwired circuitry, programmable circuitry, state machine circuitry, and/or firmware that stores instructions executed by programmable circuitry. While the circuit 100 of FIG. 1 is described herein in terms of AND, XOR and MUX logic, this circuit may alternatively be implemented using NAND and/or NOR logic, which may include, for example one or more inverter circuits. Also, the term "cycle" as used herein may refer to clock cycles. Alternatively, a "cycle" may be defined as a period of time over which a discrete operation occurs which may take one or more clock cycles (and/or fraction of a clock cycle) to complete. It should be understood at the outset that any of the operations and/or operative components described in any embodiment herein may be implemented in software, firmware, hardwired circuitry and/or any combination thereof.

Embodiments of the methods described above may be implemented in a computer program that may be stored on a storage medium having instructions to program a system (e.g., a machine) to perform the methods. The storage medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of media suitable for storing electronic instructions. Other embodiments may be implemented as software modules executed by a programmable control device.

Additionally, the circuitry of FIG. 1 and the operations described therewith may be executed on one or more integrated circuits of a computer node element, for example, executed on a host processor (which may comprise, for example, an Intel® Pentium® microprocessor and/or an Intel® Pentium® D dual core processor and/or other processor that is commercially available from the Assignee of the subject application) and/or chipset processor and/or application specific integrated circuit (ASIC) and/or other integrated circuit.

Advantageously, the circuitry of the present disclosure may be implemented with minimal hardware usage, and may therefore offer enhanced, area-efficient, IC implementation as compared with conventional approaches. Further, the methodology of the present disclosure may be implemented without a look-up table, and further, may be compatible with any Galois-field polynomial.

Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

What is claimed is:

1. An apparatus, comprising:
an integrated circuit (IC) configured to load a first data byte from a first storage device to a first register and to load a second data byte from a second storage device to a second register, the IC is further configured to AND the most significant bit (MSB) of said first data byte and a Galois-field polynomial to generate a first intermediate output, XOR each bit of the first intermediate output with the least significant bits (LSBs) of the first data byte to generate a second intermediate output, MUX the second intermediate output with each bit of the first data byte to generate a third intermediate output, and XOR each bit of the third intermediate output with each bit of the second data byte to generate at a forth intermediate output, said IC is further configured to generate a RAID Q syndrome based on, at least in part, the fourth intermediate output.

2. The apparatus of claim 1, wherein:
said IC is further configured to iteratively replace the contents of the first register with the fourth intermediate output and replace the contents of the second register with a data byte from another storage device, and repeating for each storage device in a RAID system.

3. The apparatus of claim 1, wherein:
the Galois-field polynomial is selected from the group of special primitive polynomials 11D and 14D.

4. The apparatus of claim 1, wherein:
the IC is further configured to XOR the contents of the first register with the contents of the second register to generate parity (P) data.

5. The apparatus of claim 1, wherein:
the IC is configured to selectively load the Galois-field polynomial to a third updatable register.

6. The apparatus of claim 1, wherein:
the Galois-field polynomial is an 8-bit polynomial.

7. A method, comprising:
loading a first data byte from a first storage device to a first register and loading a second data byte from a second storage device to a second register;
ANDing the most significant bit (MSB) of said first data byte and a Galois-field polynomial to generate a first intermediate output;
XORing each bit of the first intermediate output with the least significant bits (LSBs) of the first data byte to generate a second intermediate output;
MUXing the second intermediate output with each bit of the first data byte to generate a third intermediate output;
XORing each bit of the third intermediate output with each bit of the second data byte to generate at a fourth intermediate output; and
generating a RAID Q syndrome based on, at least in part, the fourth intermediate output.

8. The method of claim 7, further comprising:
iteratively replacing the contents of the first register with the fourth intermediate output and replacing the contents of the second register with a data byte from another storage device, and repeating for each storage device in a RAID system.

9. The method of claim 7, wherein:
the Galois-field polynomial is selected from the group of special primitive polynomials 11D and 14D.

10. The method of claim 7, further comprising:
XORing the contents of the first register with the contents of the second register to generate parity (P) data.

11. The method of claim 7, further comprising:
selectively load the Galois-field polynomial to a third updatable register.

12. The method of claim 7, wherein:
the Galois-field polynomial is an 8-bit polynomial.

13. An article comprising a storage medium having stored thereon instructions that when executed by a machine result in the following:
loading a first data byte from a first storage device to a first register and loading a second data byte from a second storage device to a second register;
ANDing the most significant bit (MSB) of said first data byte and a Galois-field polynomial to generate a first intermediate output;
XORing each bit of the first intermediate output with the least significant bits (LSBs) of the first data byte to generate a second intermediate output;
MUXing the second intermediate output with each bit of the first data byte to generate a third intermediate output;
XORing each bit of the third intermediate output with each bit of the second data byte to generate at a forth intermediate output; and
generating a RAID Q syndrome based on, at least in part, the fourth intermediate output.

14. The article of claim 13, further comprising:
iteratively replacing the contents of the first register with the fourth intermediate output and replacing the contents of the second register with a data byte from another storage device, and repeating for each storage device in a RAID system.

15. The article of claim 13, wherein:
the Galois-field polynomial is selected from the group of special primitive polynomials 11D and 14D.

16. The article of claim 13, further comprising:
XORing the contents of the first register with the contents of the second register to generate parity (P) data.

17. The article of claim 13, further comprising:
selectively load the Galois-field polynomial to a third updatable register.

18. The article of claim 13, wherein:
the Galois-field polynomial is an 8-bit polynomial.

19. A system, comprising:
a RAID system comprising a plurality of serial-ATA (SATA) storage devices; and an integrated circuit (IC) configured to control the operation of, and exchange commands and data with, the RAID system, said IC is further configured to load a first data byte from a first SATA storage device to a first register and to load a second data byte from a SATA second storage device to a second register, the IC is further configured to AND the most significant bit (MSB) of said first data byte and a Galois-field polynomial to generate a first intermediate output, XOR each bit of the first intermediate output with the least significant bits (LSBs) of the first data byte to generate a second intermediate output, MUX the second intermediate output with each bit of the first data byte to generate a third intermediate output, and XOR each bit of the third intermediate output with each bit of the second data byte to generate at a forth intermediate output, said IC is further configured to generate a RAID Q syndrome based on, at least in part, the fourth intermediate output.

20. The system of claim 19, wherein:
said IC is further configured to iteratively replace the contents of the first register with the fourth intermediate output and replace the contents of the second register with a data byte from another SATA storage device, and repeating for each storage device in a RAID system.

21. The system of claim 19, wherein:
the Galois-field polynomial is selected from the group of special primitive polynomials 11D and 14D.

22. The system of claim 19, wherein:
the IC is further configured to XOR the contents of the first register with the contents of the second register to generate parity (P) data.

23. The system of claim 19, wherein:
the IC is configured to selectively load the Galois-field polynomial to a third updatable register.

24. The system of claim 19, wherein:
the Galois-field polynomial is an 8-bit polynomial.

* * * * *